United States Patent
Ritter et al.

(10) Patent No.: US 9,080,596 B2
(45) Date of Patent: Jul. 14, 2015

(54) DOUBLE ENDED EXTENDABLE DRIVESHAFT FOR AUTO HEADER HOOKUP

(71) Applicant: DEERE & COMPANY, Moline, IL (US)

(72) Inventors: Aaron S. Ritter, Milan, IL (US); Brian Busath, Salt Lake City, UT (US); Austin Hughes, Kaysville, UT (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 13/925,928

(22) Filed: Jun. 25, 2013

(65) Prior Publication Data
US 2014/0378236 A1    Dec. 25, 2014

(51) Int. Cl.
*F16C 3/02* (2006.01)
*A01D 41/14* (2006.01)
*A01D 41/16* (2006.01)
*F16D 25/12* (2006.01)

(52) U.S. Cl.
CPC ................ *F16C 3/02* (2013.01); *A01D 41/142* (2013.01); *A01D 41/16* (2013.01); *F16D 25/12* (2013.01)

(58) Field of Classification Search
USPC .......... 464/162, 167, 169, 172, 182; 180/384; 56/13.5, 13.8, DIG. 6
See application file for complete search history.

(56) References Cited

U.S. PATENT DOCUMENTS

| | | | | |
|---|---|---|---|---|
| 3,171,269 A | * | 3/1965 | Gilmore et al. | 464/169 |
| 4,003,219 A | * | 1/1977 | Stull | 464/162 |
| 4,945,745 A | * | 8/1990 | Bathory et al. | 464/162 |
| 5,368,110 A | * | 11/1994 | French | 464/162 |
| 6,287,208 B1 | * | 9/2001 | Faulkenberry et al. | 464/169 |
| 7,159,378 B2 | * | 1/2007 | Rickert | 56/13.5 |
| 7,207,890 B2 | * | 4/2007 | Lukac | 464/162 |
| 7,238,113 B2 | * | 7/2007 | Lukac | 464/162 |
| 7,677,334 B2 | * | 3/2010 | Blount et al. | 175/57 |

FOREIGN PATENT DOCUMENTS

EP    1884151    * 2/2008    ............ A01D 41/16

* cited by examiner

*Primary Examiner* — Gregory Binda
*Assistant Examiner* — Josh Skroupa

(57) ABSTRACT

A double ended extendable driveshaft (106) comprises a first shaft portion (152, 154) that has a proximal end and a distal end; a first shaft coupler (110, 112) fixed to the distal end of the first shaft portion (152, 154); a first rotary coupler (160, 160', 162) supported for rotation on the proximal end of the first shaft portion (152, 154); a second shaft portion (152, 154) having a proximal end and a distal end, wherein the proximal end of the second shaft portion (152, 154) is slidingly coupled to the proximal end of the first shaft portion (152, 154); a second shaft coupler (110, 112) fixed to the distal end of the second shaft portion (152, 154); a second rotary coupler (160, 160', 162) supported for rotation on the proximal end of the second shaft portion (152, 154); and an actuator (158) coupled to the first rotary coupler (160, 160', 162) and the second rotary coupler (160, 160', 162) to extend and retract the first shaft portion (152, 154) with respect to the second shaft portion (152, 154).

14 Claims, 4 Drawing Sheets

DOUBLE ENDED EXTENDABLE DRIVESHAFT FOR AUTO HEADER HOOKUP

RELATED APPLICATIONS

This application is related to U.S. patent application Ser. No. 13/780,669 filed 28 Feb. 2013 and to U.S. patent application Ser. No. 13/780,547 also filed 28 Feb. 2013.

FIELD

This invention relates to agricultural harvesters. More particularly, it relates to agricultural harvesters with disengageable agricultural harvesting heads. Even more particularly, it relates to devices for automatically engaging and disengaging agricultural harvesting heads from agricultural harvesters.

BACKGROUND

Agricultural harvesters, often called combines, are large machines with an operator station perhaps three meters in the air. Operators drive these vehicles over the road towing the agricultural harvesting head until they reach an agricultural field to be harvested. Once in the field, the agricultural harvesting head is disengaged from the agricultural harvester, the agricultural harvester is brought around to face the agricultural harvesting head, and the agricultural harvesting head is engaged to the front of the agricultural harvester. This process may happen several times in a day. During harvesting season, it is important for the operator to be able to travel from field to field harvesting crops as quickly as possible.

One difficulty that often appears is the need for the operator to position the agricultural harvesting head on the ground, then climb into the operator station of the agricultural harvester, then drive the agricultural harvester into initial engagement with the agricultural harvesting head, then climb back down from the operator station, then make various mechanical, electrical, and hydraulic connections between the agricultural harvester in the agricultural harvesting head, then climb back up to the operator station.

This climbing up and down delays crop harvesting, and further, may be difficult for an operator of advanced years.

In a related application, U.S. patent application Ser. No. 13/780,669, which is incorporated herein by reference for all that it teaches, an inventor of the present application described a driveshaft that was configured to be automatically extended from one side of the agricultural harvester toward a mating driveshaft on the same side of the agricultural harvesting head without requiring the operator to manually grasp and extend the driveshaft.

In another related application, U.S. patent application Ser. No. 13/780,547, which is also incorporated herein by reference for all that it teaches, and inventor of the present application described a driveshaft coupler that would couple the extended driveshaft to a driveshaft on the agricultural harvesting head without requiring the operator to manually coupled the two drive shafts together.

One problem with the arrangement above is that the driveshaft extends from only one side of the agricultural harvester. Many agricultural harvesters engage two drive shafts on an agricultural harvesting head, with one driveshaft extending from one side of the agricultural harvester in a first direction and the other drive shaft extending from the other side of the agricultural harvester in the opposite direction.

It is an object of this invention to provide a driveshaft for an agricultural harvester that extends in opposite directions from both the left and the right side of the agricultural harvester.

SUMMARY

In accordance with one aspect of the invention a double ended extendable driveshaft is provided, comprising: a first shaft portion that has a proximal end and a distal end; a first shaft coupler fixed to the distal end of the first shaft portion; a first rotary hydraulic coupler supported for rotation on the proximal end of the first shaft portion; a second shaft portion having a proximal end and a distal end, wherein the proximal end of the second shaft portion is slidingly coupled to the proximal end of the first shaft portion; a second shaft coupler fixed to the distal end of the second shaft portion; a second rotary hydraulic coupler supported for rotation on the proximal end of the second shaft portion; and an actuator coupled to the first rotary hydraulic coupler and the second rotary hydraulic coupler to extend and retract the first shaft portion with respect to the second shaft portion.

The first shaft coupler and the second shaft coupler may be actuated by hydraulic fluid.

The first shaft portion may be elongate and may have first longitudinal axis, the first rotary hydraulic coupler may be supported on the first shaft portion to rotate about the first longitudinal axis, the second shaft portion may be elongate and may have a second longitudinal axis, the second rotary hydraulic coupler may be supported on the second shaft portion to rotate about the second longitudinal axis, and the first longitudinal axis and the second longitudinal axis maybe collinear.

The proximal end of the first shaft portion may be received inside the proximal end of the second shaft portion to slide with respect to the proximal end of the second shaft portion when the actuator is extended and retracted.

The proximal end of the first shaft portion may have a splined outer surface, the proximal end of the second shaft portion may have a splined inner surface, and the splined outer surface and the splined inner surface may interengage to communicate torque between the first shaft portion and the second shaft portion.

The first rotary hydraulic coupler may be configured to be fluidly coupled to a first hydraulic line to communicate hydraulic fluid from the first hydraulic line through the first rotary hydraulic coupler, and to convey hydraulic fluid received from the first hydraulic line into a first longitudinal passageway in the first shaft portion.

The first longitudinal passageway may be in fluid communication with the first shaft coupler to receive hydraulic fluid from the first hydraulic line and convey it to the first shaft coupler.

The first longitudinal passageway may be in fluid communication with the second shaft coupler to receive hydraulic fluid from the first hydraulic line and convey it to the second shaft coupler.

In accordance with a second aspect of the invention, a double ended extendable driveshaft is provided, comprising: a first shaft portion that has a proximal end and a distal end; a first shaft coupler fixed to the distal end of the first shaft portion; a first rotary coupler supported for rotation on the proximal end of the first shaft portion; a second shaft portion having a proximal end and a distal end, wherein the proximal end of the second shaft portion is slidingly coupled to the proximal end of the first shaft portion; a second shaft coupler fixed to the distal end of the second shaft portion; a second rotary coupler supported for rotation on the proximal end of the second shaft portion; and an actuator coupled to the first rotary coupler and the second rotary coupler to extend and retract the first shaft portion with respect to the second shaft portion.

The first shaft coupler and the second shaft coupler may be actuated by hydraulic fluid.

The first shaft portion may be elongate and may have a first longitudinal axis, the first rotary coupler may be supported on the first shaft portion to rotate about the first longitudinal axis, the second shaft portion may be elongate and may have a second longitudinal axis, the second rotary coupler may be supported on the second shaft portion to rotate about the second longitudinal axis, and the first longitudinal axis and the second longitudinal axis maybe collinear.

The proximal end of the first shaft portion may be received inside the proximal end of the second shaft portion to slide with respect to the proximal end of the second shaft portion when the actuator is extended and retracted.

The proximal end of the first shaft portion may have a splined outer surface, the proximal end of the second shaft portion may have a splined inner surface, and the splined outer surface and the splined inner surface may interengage to communicate torque between the first shaft portion and the second shaft portion.

The first rotary coupler may be configured to be fluidly coupled to a first hydraulic line to communicate hydraulic fluid from the first hydraulic line through the first rotary coupler, and to convey hydraulic fluid received from the first hydraulic line into a first longitudinal passageway in the first shaft portion.

The first longitudinal passageway may be in fluid communication with the first shaft coupler to receive hydraulic fluid from the first hydraulic line and convey it to the first shaft coupler.

The first longitudinal passageway may be in fluid communication with the second shaft coupler to receive hydraulic fluid from the first hydraulic line and convey it to the second shaft coupler.

DETAILED DESCRIPTION

This application is related to U.S. patent application Ser. No. 13/780,669 and U.S. patent application Ser. No. 13/780,547, both of which are incorporated herein by reference for all that they teach and in particular, details of the construction and operation of a shaft coupler.

Figure 1:
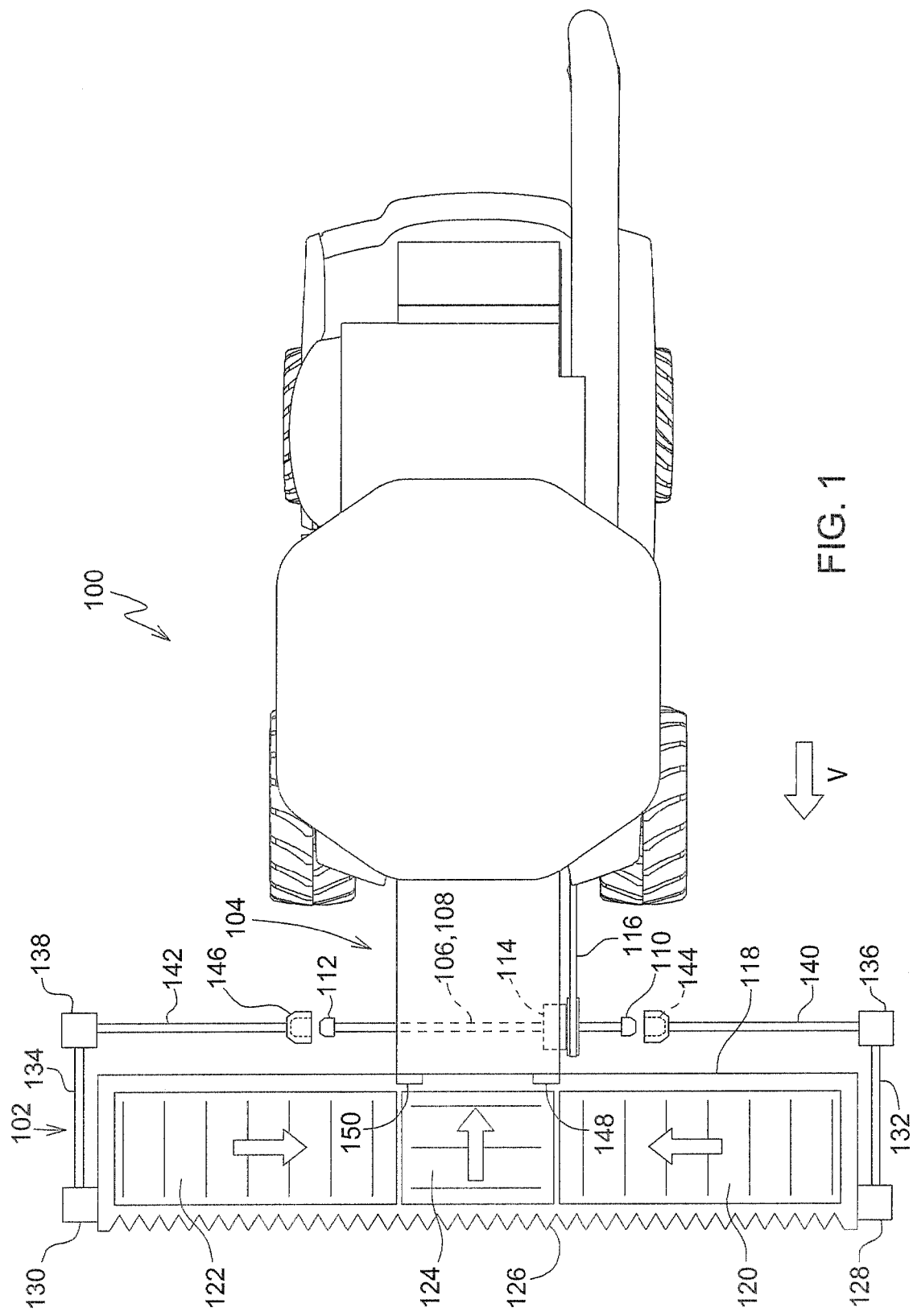
FIG. 1 is a plan view of an agricultural harvester and agricultural harvesting head in accordance with the present invention.

In FIG. 1, an agricultural harvester 100 is shown supporting an agricultural harvesting head 102 on a feederhouse 104 that is coupled to and extends forward from the agricultural harvester 100.

A driveshaft 106 is supported on and is disposed underneath the forward end of the feederhouse 104. The driveshaft 106 extends laterally and generally perpendicular to a direction of travel "V". The driveshaft 106 includes a shaft portion 108, a first shaft coupler 110 disposed on the left end of the shaft portion 108, and the second shaft coupler 112 disposed on the right end of the shaft portion 108. The driveshaft 106 extends through and is driven by a gearbox 114. The gearbox 114 is driven by a belt 116 that extends forward from the agricultural harvester 100. The belt 116 is driven by the engine (not shown) of the agricultural harvester 100. The gearbox 114 is fixed to the front of the feederhouse 104 at a lower part of the feederhouse 104 to thereby permit the driveshaft 106 to extend laterally underneath the feederhouse 104. This arrangement keeps the driveshaft 106 and the gearbox 114 out of the operator's way so the operator can view the agricultural harvesting head 102 immediately in front of him without visual obstruction.

The agricultural harvesting head 102 includes a frame 118 that extends laterally and generally perpendicular to the direction of travel "V".

The frame 118 supports a left side conveyor 120 that conveys crop inwardly from the left side of the agricultural harvesting head 102 towards a central region of the agricultural harvesting head 102.

The frame 118 also supports a right side conveyor 122 that conveys crop inwardly from the right side of the agricultural harvesting head 102 towards a central region of the agricultural harvesting head 102.

A central conveyor 124 is disposed between the left side conveyor 120 and the right side conveyor 122. The central conveyor 124 is disposed to receive crop material from the left side conveyor 120 and the right side conveyor 122. The central conveyor 124 conveys crop rearward into an opening in the feederhouse 104.

A conveyor (not shown) disposed inside the feederhouse 104 carries the crop material rearward and into the agricultural harvester 100 itself for further processing.

A reciprocating knife 126 extends across a forward portion of the frame 118. The reciprocating knife 126 is supported on the frame 118.

The reciprocating knife 126 is driven by a left side gearbox 128 and a right side gearbox 130. The left side gearbox 128 and the right side gearbox 130 are disposed at the left end and the right end, respectively, of the agricultural harvesting head 102.

The left side gearbox 128 is driven by a forwardly extending driveshaft 132. The right side gearbox 130 is driven by forwardly extending driveshaft 134. The forwardly extending driveshaft 132 is driven by a gearbox 136 disposed at the rear of the frame 118 on the left side of the agricultural harvesting head 102. The forwardly extending driveshaft 134 is driven by gearbox 138 disposed at the rear of the frame 118 on the right side of the agricultural harvesting head 102.

The gearbox 136 is driven by a driveshaft 140 that extends from the left rear of the agricultural harvesting head 102 laterally inward toward the feederhouse 104 and perpendicular to the direction of travel "V". The gearbox 138 is driven by a driveshaft 142 that extends from the right rear of the agricultural harvesting head 102 laterally inward toward the feederhouse 104 and perpendicular to the direction of travel "V".

The inward end of the driveshaft 140 is fixed to a third shaft coupler 144. The third shaft coupler 144 is configured such that when it is driven in rotation, it responsively drives the driveshaft 140 in rotation, which responsively drives the gearbox 136, which responsively drives the forwardly extending driveshaft 132 in rotation, which responsively drives the left side gearbox 128, which responsively drives the left end of the reciprocating knife 126.

The inward end of the driveshaft 142 is fixed to a fourth shaft coupler 146. The fourth shaft coupler 146 is configured such that when it is driven in rotation, it responsively drives the driveshaft 142 in rotation, which responsively drives the gearbox 138, which responsively drives the forwardly extending driveshaft 134 in rotation, which responsively drives the right side gearbox 130, which responsively drives the right end of the reciprocating knife 126.

The agricultural harvesting head 102 is supported on the feederhouse 104 by a first bracket 148 and a second bracket 150.

When the agricultural harvesting head 102 is first lifted and supported on the feederhouse 104, the first shaft coupler 110 is aligned with the third shaft coupler 144. In this manner, when the shaft portion 108 is extended in length, the first shaft coupler 110 will translate laterally outward (i.e. to the left) and mechanically engage the third shaft coupler 144. Extendable lugs disposed inside the first shaft coupler 110 will extend outward and engage inwardly facing recesses located on an inner surface of the third shaft coupler 144. In this manner, the first shaft coupler 110 and the third shaft coupler 144 will be engaged such that any rotation of the driveshaft 106 (and hence the first shaft coupler 110) will rotate the third shaft coupler 144.

When the agricultural harvesting head 102 is first lifted and supported on the feederhouse 104, the second shaft coupler 112 is aligned with the fourth shaft coupler 146. In this manner, when the shaft portion 108 is extended in length, the second shaft coupler 112 will translate laterally outward (i.e. to the right) and mechanically engage the fourth shaft coupler 146. Extendable lugs disposed inside the second shaft coupler 112 will extend outward and engage inwardly facing recesses located on an inner surface of the fourth shaft coupler 146. In this manner, the second shaft coupler 112 and the fourth shaft coupler 146 will be engaged such that any rotation of the driveshaft 106 (and hence the second shaft coupler 112) will rotate the fourth shaft coupler 146.

Figure 2:
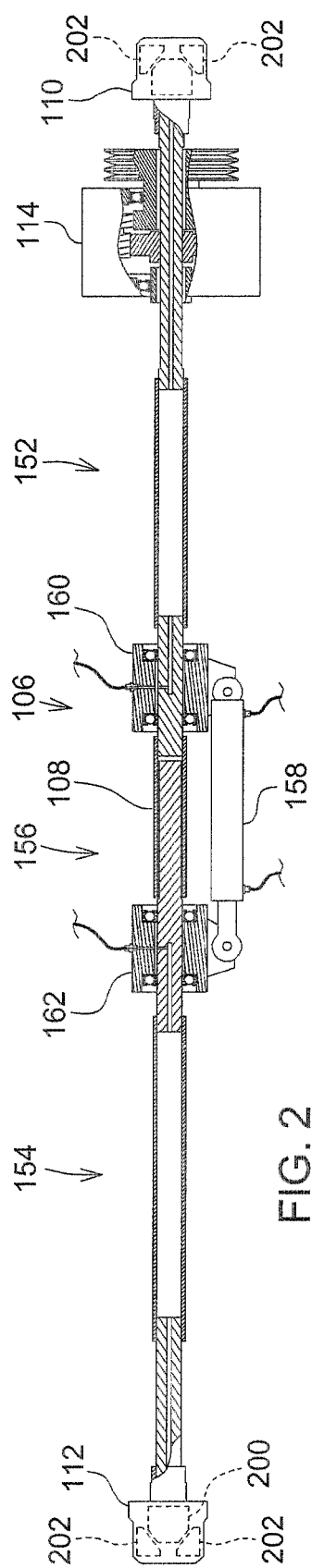
FIG. 2 is a partial cross-sectional front view of the feederhouse drive shaft in FIG. 1.

Referring to FIG. 2, the shaft portion 108 comprises a left shaft portion 152, a right shaft portion 154, a sliding joint 156, an actuator 158, a left side rotary hydraulic coupler 160, and right side rotary hydraulic coupler 162.

The actuator 158 is coupled at its rod end to the left side rotary hydraulic coupler 160 at its cylinder end to the right side rotary hydraulic coupler 162. The actuator 158 can be extended in length by injecting hydraulic fluid into the rod end hydraulic port 164. The actuator 158 can be reduced in length by injecting hydraulic fluid into the cylinder end hydraulic port 166.

Since the actuator 158 is coupled to the left side rotary hydraulic coupler 160 at one end and coupled to the right side rotary hydraulic coupler 162 at the other end, it drives the two couplers apart when it is extended in length and pulls the two couplers together when it is reduced in length.

The left side rotary hydraulic coupler 160 is supported on bearings 161 on the left shaft portion 152 such that the left side rotary hydraulic coupler 160 rotates freely about the left shaft portion 152.

The bearings 161 hold the left side rotary hydraulic coupler 160 on the left shaft portion 152 at a fixed axial position on the left shaft portion 152.

Whenever the actuator 158 moves the left side rotary hydraulic coupler 160 in an axial direction (i.e. parallel to the longitudinal axis of the driveshaft 106), the left side rotary hydraulic coupler 160 responsively moves the left shaft portion 152 in the axial direction by the same amount.

The right side rotary hydraulic coupler 162 is supported on bearings 163 on the right shaft portion 154 such that the right side rotary hydraulic coupler 162 rotates freely about the right shaft portion 154. The bearings 163 hold the right side rotary hydraulic coupler 162 on the right shaft portion 154 at a fixed axial position.

Whenever the actuator 158 moves the right side rotary hydraulic coupler 162 in an axial direction (i.e. parallel to the longitudinal axis of the driveshaft 106), the right side rotary hydraulic coupler 162 responsively moves the right shaft portion 154 in the axial direction by the same amount.

In this manner, when the actuator 158 extends, it pushes the left side rotary hydraulic coupler 160 away from the right side rotary hydraulic coupler 162, which moves the left shaft portion 152 axially away from the right shaft portion 154, thereby extending the shaft portion 108 in length due to the axial forces applied by the left side rotary hydraulic coupler 160 to the left shaft portion 152 and the axial forces applied by the right side rotary hydraulic coupler 162 to the right shaft portion 154.

Figure 4:
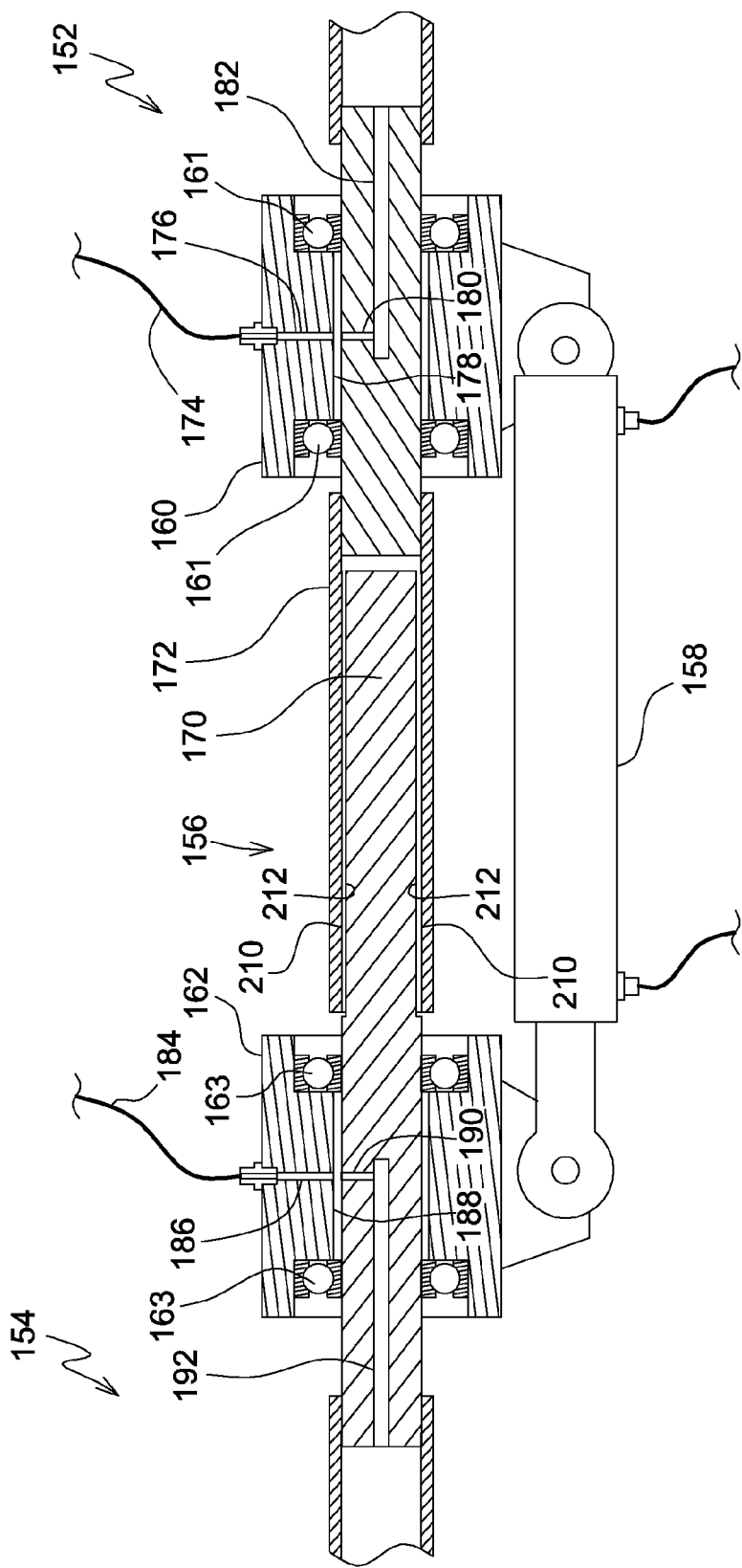
FIG. 4 is a partial cross-sectional front view of the central region of the feederhouse drive shaft of FIGS. 1-3.

Referring now to FIG. 4, the left shaft portion 152 and the right shaft portion 154 are coupled together by a sliding joint 168. The left shaft portion 152 has a proximal end 172. The right shaft portion 154 has a proximal end 170. The proximal end 172 of the left shaft portion 152 and the proximal end 170 of the right shaft portion 154 comprise the sliding joint 168.

The sliding joint 168 is a spline joint comprising (a) the proximal end 170 of the right shaft portion 154 which has external splines, and (b) the proximal end 172 of the left shaft portion 152 which has internal splines.

The proximal end 170 of the right shaft portion 154 is received inside and is slidingly coupled to the proximal end 172 of the left shaft portion 152. The internal splines 212 of the proximal end 172 are configured to both mate with and slide with respect to the external splines 210 of the proximal end 170. This sliding joint 156 permits the left shaft portion 152 to translate in an axial direction with respect to the right shaft portion 154 whenever the actuator 158 is extended or retracted while at the same time communicating torque from the left shaft portion 152 to the right shaft portion 154 and ensuring that the left shaft portion 152 and the right shaft portion 154 rotate at exactly the same speed.

The left side rotary hydraulic coupler 160 is connected to hydraulic line 174. Hydraulic line 174 supplies hydraulic fluid under pressure to the left side rotary hydraulic coupler 160. The hydraulic fluid travels through a passageway 176 into a cylindrical chamber 178 that is defined between an inner cylindrical surface of the left side rotary hydraulic coupler 160 and an outer cylindrical surface of the left shaft portion 152. From there the hydraulic fluid under pressure is communicated through a radial passageway 180 in the left shaft portion 152 into a longitudinal passageway 182 that extends substantially the entire length of the left shaft portion 152 and into the first shaft coupler 110.

The right side rotary hydraulic coupler 162 is connected to hydraulic line 184. Hydraulic line 184 supplies hydraulic fluid under pressure to the right side rotary hydraulic coupler 162. The hydraulic fluid travels through a passageway 186 into a cylindrical chamber 188 is defined between an inner cylindrical surface of the right side rotary hydraulic coupler 162 and an outer cylindrical surface of the right shaft portion 154. From there the hydraulic fluid under pressure is communicated to a radial passageway 190 in the right shaft portion 154 into a longitudinal passageway 192 that extends substantially the entire length of the right shaft portion 154 and into the second shaft coupler 112.

Figure 3:
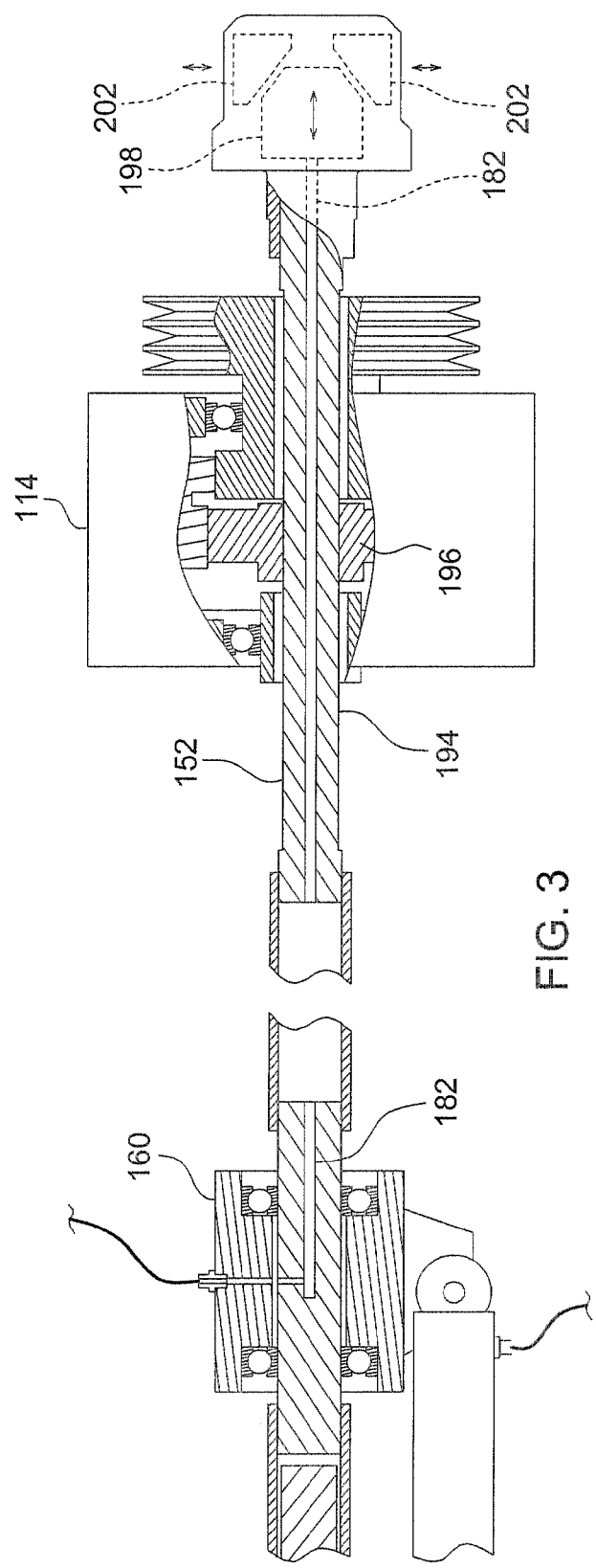
FIG. 3 is a partial cross-sectional front view of a left end of the feederhouse drive shaft of FIGS. 1-2.

Referring now to FIG. 3, the gearbox 114 extends completely around and encloses the left shaft portion 152. The left shaft portion 152 extends completely through the gearbox 114 and has a splined outer surface 194 that slidingly engages the inner splined surface of a gear 196 located inside the gearbox 114.

When the gearbox 114 is driven by the belt 116, a gear train in the gearbox 114 drivingly coupled to the gear 196 causes the gear 196 to rotate about its longitudinal axis, which is also the longitudinal axis of the driveshaft 106. As the gear 196 is driven in rotation, the splines on the inner surface of the gear 196 engage the splines on the outer surface of the left shaft portion 152 and rotate the left shaft portion 152. Since the sliding joint 168 is similarly equipped with splines, the right shaft portion 154 also rotates.

By this arrangement, a belt driving the gearbox 114 causes the driveshaft 106, the first shaft coupler 110 and the second shaft coupler 112 to rotate about their longitudinal axes.

Whenever the actuator 158 extends or retracts, the actuator 158 slides the left shaft portion 152 axially with respect to the gearbox 114. Thus, by extending and retracting the actuator 158, the overall length of the driveshaft 106 can be extended and retracted, respectively, and the distance between the first shaft coupler 110 and the second shaft coupler 112 can be increased and decreased, respectively.

In normal operation, the operator can remain in the operator station of the agricultural harvester 100 and operate valve (not shown) that causes hydraulic fluid to flow into the rod end of the actuator 158. This causes the actuator 158 to extend, and causes the distance between the first shaft coupler 110 and the second shaft coupler 112 to increase.

Referring now to FIG. 1, as the distance between the first shaft coupler 110 and the second shaft coupler 112 increases, the first shaft coupler 110 moves towards the third shaft coupler 144, and the second shaft coupler 112 moves towards the fourth shaft coupler 146. As a result of this, the first shaft coupler 110 and the second shaft coupler 112 will be received in and engage the third shaft coupler 144 and the fourth shaft coupler 146, respectively.

At this point, the operator can remain in the operator station of the agricultural harvester 100 and operate another valve or valves (not shown) that conduct hydraulic fluid under pressure into the left side rotary hydraulic coupler 160 and the right side rotary hydraulic coupler 162. The hydraulic fluid will travel through the longitudinal passageway 182 until it impinges upon a piston 198 disposed inside the body of the first shaft coupler 110 and a piston 200 disposed inside the body of the second shaft coupler 112. Piston 198 and piston 200 move axially outward and away from the feederhouse 104, to abut a plurality of keys 202. Additional hydraulic fluid flow into the first shaft coupler 110 and the second shaft coupler 112 cause the piston 198 and the piston 200 to force their respective plurality of keys 202 radially outward and into an internal sidewall of the third shaft coupler 144 and the fourth shaft coupler 146, respectively. Apertures in the internal sidewalls of the third shaft coupler 144 and the fourth shaft coupler 146 receive the outer ends of the plurality of keys 202 and permit the first shaft coupler 110 to communicate torque to and drive the third shaft coupler 144 in rotation, and permit the second shaft coupler 112 to communicate torque to and drive the fourth shaft coupler 146 in rotation.

To automatically disconnect the first shaft coupler 110 from the third shaft coupler 144 and the second shaft coupler 112 from the fourth shaft coupler 146, the operator reverses the process by actuating a valve or valves to release hydraulic fluid from the left side rotary hydraulic coupler 160 and the right side rotary hydraulic coupler 162. This permits the plurality of keys 202 to retract into the first shaft coupler 110 and the second shaft coupler 112. At this time the operator can actuate another valve into the rod end of the actuator 158, which causes the driveshaft 106 to be reduced in length, and causes the first shaft coupler 110 and the second shaft coupler 112 to be completely withdrawn and separated from the third shaft coupler 144 and the fourth shaft coupler 146, respectively.

Figure 5:
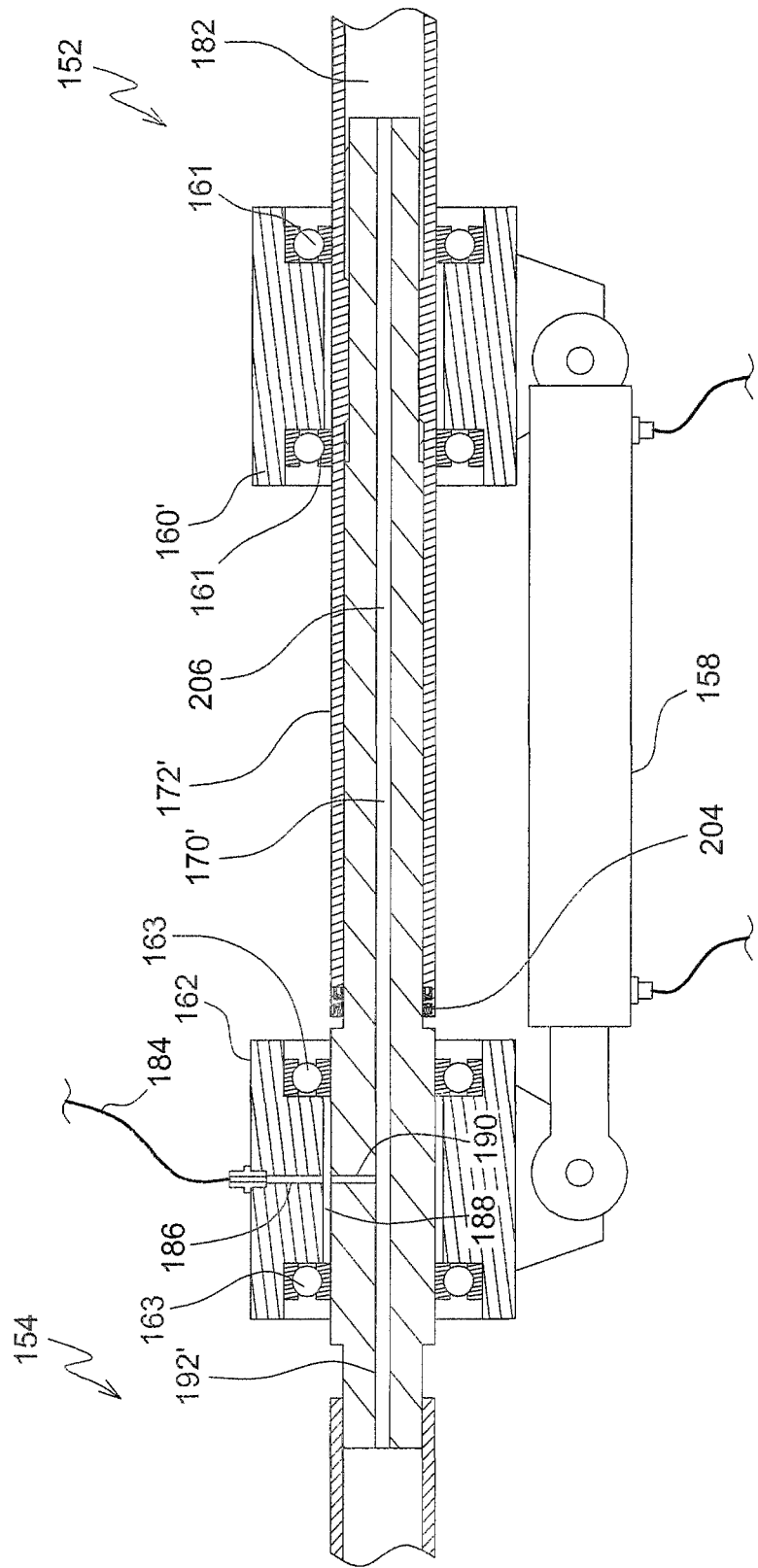
FIG. 5 is a partial cross-sectional front view of an alternative central region of the feederhouse driveshaft of FIGS. 1-3.

FIG. 5 illustrates an alternative configuration of the central region of the driveshaft 106 of FIGS. 1-4 having several structural differences from the embodiment of FIGS. 1-4.

One difference is that the left side rotary hydraulic coupler 160 is not required to communicate hydraulic fluid to the first shaft coupler 110 and the second shaft coupler 112. For this reason, the left side rotary hydraulic coupler 160 shown in FIGS. 1-4 is replaced in FIG. 5 with a left side rotary coupler 160'. The left side rotary coupler 160' lacks the hydraulic connections and passageways that the left side rotary hydraulic coupler 160 has in the embodiment of FIGS. 1-4. In all other respects, the left side rotary hydraulic coupler 160 and the left side rotary coupler 160' function the same.

Another difference is that the longitudinal passageway 192' of FIG. 5, unlike the longitudinal passageway 192 of FIGS. 1-4, extends completely through the proximal end 170 (shown in FIG. 5 as proximal end 170') to connect directly to the longitudinal passageway 182 in left shaft portion 152.

By this difference, hydraulic fluid entering the radial passageway 190 in the right side rotary hydraulic coupler 162 can fill both the longitudinal passageway 192' and the longitudinal passageway 182.

By filling both passageways, a single rotary hydraulic coupler, i.e. the right side rotary hydraulic coupler 162, is configured to (a) to communicate hydraulic fluid to both the first shaft coupler 110 and the second shaft coupler 112 and (b) to cause both the first shaft coupler 110 and the second shaft coupler 112 to engage with the third shaft coupler 144 and the fourth shaft coupler 146, respectively.

Since the first shaft coupler 110 and the second shaft coupler 112 are charged through a single rotary hydraulic coupler, the hydraulic connection to the left side rotary hydraulic coupler 160 can be removed and can be replaced with the left side rotary coupler 160', which functions the same as the left side rotary hydraulic coupler 160 except for not conducting hydraulic fluid.

In another arrangement not pictured herein, the right side rotary hydraulic coupler 162 and the left side rotary coupler 160' shown in FIG. 5 can be exchanged, one for the other.

When actuator 158 extends, the left side rotary coupler 160' and the right side rotary hydraulic coupler 162 are forced apart in same manner as in the embodiment of FIGS. 1-4.

When actuator 158 retracts, the left side rotary coupler 160'and the right side rotary hydraulic coupler 162 are pulled together in the same manner as in the embodiment of FIGS. 1-4.

Thus, the operation of actuator 158 to extend and retract the driveshaft 106 functions in FIG. 5 in the same manner as in the embodiment of FIGS. 1-4.

Another difference between the embodiment of FIG. 5 and the embodiment of FIGS. 1-4 is the addition of a seal 204 to prevent the leakage of hydraulic fluid.

The proximal end 172' is modified to include the seal 204. The seal 204 extends about and seals against the outer surface of proximal end 170' of right shaft portion 154. The outer surface of proximal end 170' about which the seal 204 extends is smooth, to provide sealing between the proximal end 172'and the outer surface of the proximal end 170'. This sealing retains hydraulic fluid inside the driveshaft 106.

Because of this difference, the proximal end 172 shown in FIG. 5 is identified as proximal end 172'. In all other respects and functionalities, the proximal end 172 and the proximal end 172'are the same.

Another variation in the embodiment of FIG. 5 as compared to the embodiment of FIGS. 1-4 is the addition of a longitudinal passageway 206 that passes through the proximal end 170. The longitudinal passageway 206 permits hydraulic fluid entering the right side rotary hydraulic coupler 162' to flow in a leftward direction to the first shaft coupler 110.

Because of this difference, the proximal end 170 shown in FIG. 5 is identified as proximal end 170'. In all other respects and functionalities, the proximal end 170 and the proximal end 170' are the same.

FIG. 5 shows that two separate hydraulic connections, one on each of the couplers, are not required. For example, a single hydraulic connection is configured to provide hydraulic fluid to both the first shaft coupler 110 and the second shaft coupler 112. It is necessary, however, in the arrangement of FIG. 5 to provide an additional path (i.e. the longitudinal passageway 206 in the embodiment of FIG. 5) for hydraulic fluid to flow from the single hydraulic connection to both the first shaft coupler 110 and the second shaft coupler 112. Thus, hydraulic fluid for actuating the first shaft coupler 110 passes through the proximal end 170' disposed inside the proximal end 172'.

It should be understood that the particular embodiments shown and discussed herein are not the only ways in which the invention can exist. They are the currently preferred embodiments of the invention. One skilled in the art of agricultural harvester and agricultural harvesting head design and manufacture can readily see other variations that would also fall within the scope of the appended claims.

We claim:

1. A double ended extendable driveshaft (106), comprising:
   a first shaft portion (152, 154) that has a proximal end and a distal end;
   a first shaft coupler (110, 112) fixed to the distal end of the first shaft portion (152, 154);
   a first rotary hydraulic coupler (160, 162) supported for rotation on the proximal end of the first shaft portion (152, 154);
   a second shaft portion (152, 154) having a proximal end and a distal end, wherein the proximal end of the second shaft portion (152, 154) is slidingly coupled to the proximal end of the first shaft portion (152, 154);
   a second shaft coupler (110, 112) fixed to the distal end of the second shaft portion (152, 154);
   a second rotary hydraulic coupler (160, 162) supported for rotation on the proximal end of the second shaft portion (152, 154);
   at least a first bearing (161, 163) supporting the first rotary hydraulic coupler (160, 162) on the first shaft portion (152, 154) for rotation of the first rotary hydraulic coupler (160, 162) about the first shaft portion (152, 154);
   at least a second bearing (161, 163) supporting the second rotary hydraulic coupler (160, 162) on the second shaft portion (152, 154) for rotation of the second rotary hydraulic coupler (160, 162) about the second shaft portion (152, 154); and
   an actuator (158) coupled to the first rotary hydraulic coupler (160, 162) and the second rotary hydraulic coupler (160, 162) to extend and retract the first shaft portion (152, 154) with respect to the second shaft portion (152, 154), wherein the first rotary hydraulic coupler (160, 162) is configured to be fluidly coupled to a first hydraulic line (174, 184) to communicate hydraulic fluid from the first hydraulic line (174, 184) through the first rotary hydraulic coupler (160, 162), and to convey hydraulic fluid received from the first hydraulic line (174, 184) into a first longitudinal passageway (182, 192) in the first shaft portion (152, 154).

2. The double ended extendable driveshaft (106) of claim 1, wherein the first shaft coupler (110, 112) and the second shaft coupler (110, 112) are actuated by hydraulic fluid.

3. The double ended extendable driveshaft (106) of claim 1, wherein the first shaft portion (152, 154) is elongate and has a first longitudinal axis, wherein the first rotary hydraulic coupler (160, 162) is supported on the first shaft portion (152, 154) to rotate about the first longitudinal axis, wherein the second shaft portion (152, 154) is elongate and has a second longitudinal axis, wherein the second rotary hydraulic coupler (160, 162) is supported on the second shaft portion (152, 154) to rotate about the second longitudinal axis, and further wherein the first longitudinal axis and the second longitudinal axis are collinear.

4. The double ended extendable driveshaft (106) of claim 1, wherein the proximal end of the first shaft portion (154) is received inside the proximal end of the second shaft portion (152) to slide with respect to the proximal end of the second shaft portion (152) when the actuator (158) is extended and retracted.

5. The double ended extendable driveshaft (106) of claim 4, wherein the proximal end of the first shaft portion (154) has a splined outer surface (194), wherein the proximal end of the second shaft portion (152) has a splined inner surface, and further wherein the splined outer surface (194) and the splined inner surface interengage to communicate torque between the first shaft portion (154) and the second shaft portion (152).

6. The double ended extendable driveshaft (106) of Claim 1, wherein the first longitudinal passageway (182, 192) is in fluid communication with the first shaft coupler (110, 112) to receive hydraulic fluid from the first hydraulic line (174, 184) and convey it to the first shaft coupler (110, 112).

7. The double ended extendable driveshaft (106) of claim 6, wherein the first longitudinal passageway (182, 192) is in fluid communication with the second shaft coupler (110, 112) to receive hydraulic fluid from the first hydraulic line (174, 184) and convey it to the second shaft coupler (110, 112).

8. A double ended extendable driveshaft (106), comprising:
   a first shaft portion (152, 154) that has a proximal end and a distal end;
   a first shaft coupler (110, 112) fixed to the distal end of the first shaft portion (152, 154);
   a first rotary coupler (160, 160') supported for rotation on the proximal end of the first shaft portion (152, 154);
   a second shaft portion (152, 154) having a proximal end and a distal end, wherein the proximal end of the second shaft portion (152, 154) is slidingly coupled to the proximal end of the first shaft portion (152, 154);
   a second shaft coupler (110, 112) fixed to the distal end of the second shaft portion (152, 154);
   a second rotary coupler (160, 160', 162) supported for rotation on the proximal end of the second shaft portion (152, 154);
   at least a first bearing (161, 163) supporting the first rotary coupler (160, 160', 162) on the first shaft portion (152, 154) for rotation of the first rotary coupler (160, 160', 162) about the first shaft portion (152, 154);
   at least a second bearing (161, 163) supporting the second rotary coupler (160, 160', 162) on the second shaft portion (152, 154) for rotation of the second rotary coupler (160, 160', 162) about the second shaft portion (152, 154); and an actuator (158) coupled to the first rotary coupler (160, 160', 162) and the second rotary coupler (160, 160', 162) to extend and retract the first shaft portion (152, 154) with respect to the second shaft portion (152, 154) wherein the first rotary coupler (160, 162) is configured to be fluidly coupled to a first hydraulic line (184) to communicate hydraulic fluid from the first hydraulic line (184) through the first rotary coupler (160, 162), and to convey hydraulic fluid received from the first hydraulic line (184) into a first longitudinal passageway (206) in the first shaft portion (152, 154).

9. The double ended extendable driveshaft (106) of claim 8, wherein the first shaft coupler (110, 112) and the second shaft coupler (110, 112) are actuated by hydraulic fluid.

10. The double ended extendable driveshaft (106) of claim 8, wherein the first shaft portion (152, 154) is elongate and has a first longitudinal axis, wherein the first rotary coupler (160, 162) is supported on the first shaft portion (152, 154) to rotate about the first longitudinal axis, wherein the second shaft portion (152, 154) is elongate and has a second longitudinal axis, wherein the second rotary coupler (160, 162) is supported on the second shaft portion (152, 154) to rotate about the second longitudinal axis, and further wherein the first longitudinal axis and the second longitudinal axis are collinear.

11. The double ended extendable driveshaft (106) of claim 8, wherein the proximal end of the first shaft portion (154) is received inside the proximal end of the second shaft portion (152) to slide respect to the proximal end of the second shaft portion (152) when the actuator (158) is extended and retracted.

12. The double ended extendable driveshaft (106) of claim 11, wherein the proximal end of the first shaft portion (154) has a splined outer surface (194), wherein the proximal end of the second shaft portion (152) has a splined inner surface, and further wherein the splined outer surface (194) and the splined inner surface interengage to communicate torque between the first shaft portion (154) and the second shaft portion (152).

13. The double ended extendable driveshaft (106) of claim 8, wherein the first longitudinal passageway (206) is in fluid communication with the first shaft coupler (110, 112) to receive hydraulic fluid from the first hydraulic line (184) and convey it to the first shaft coupler (110, 112).

14. The double ended extendable driveshaft (106) of claim 13, wherein the first longitudinal passageway (206) is in fluid communication with the second shaft coupler (110, 112) to receive hydraulic fluid from the first hydraulic line (184) and convey it to the second shaft coupler (110, 112).

\* \* \* \* \*